July 7, 1936.  C. A. KETTL  2,046,386
BORING TOOL
Filed July 3, 1935   2 Sheets-Sheet 1
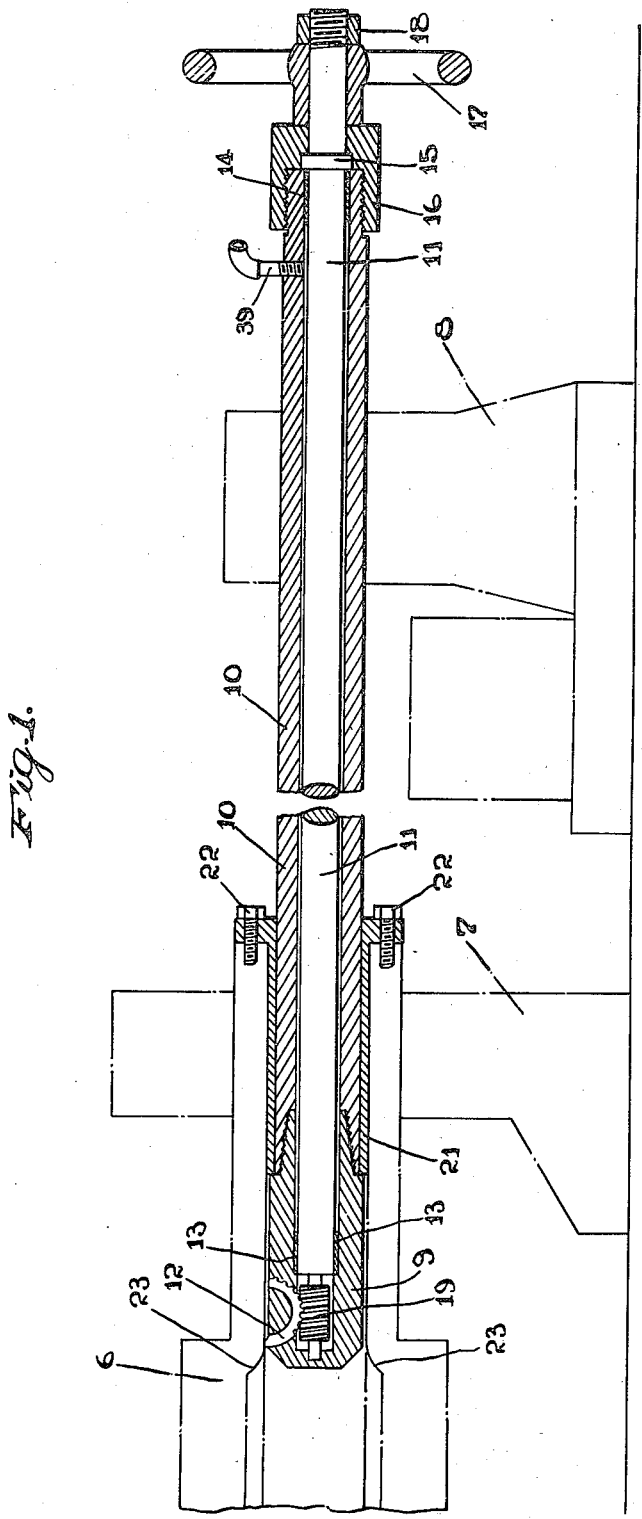
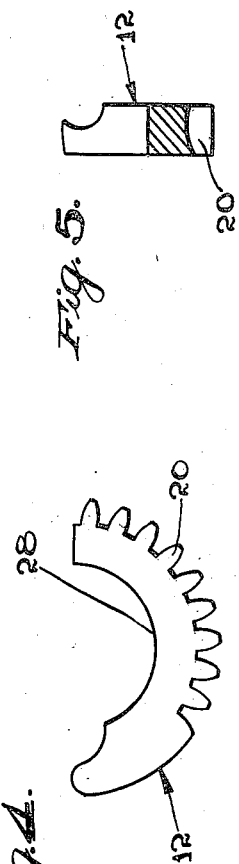
INVENTOR.
CLEMENT A. KETTL
BY Bradley & Bee
ATTORNEYS.

July 7, 1936.  C. A. KETTL  2,046,386
BORING TOOL
Filed July 3, 1935  2 Sheets-Sheet 2
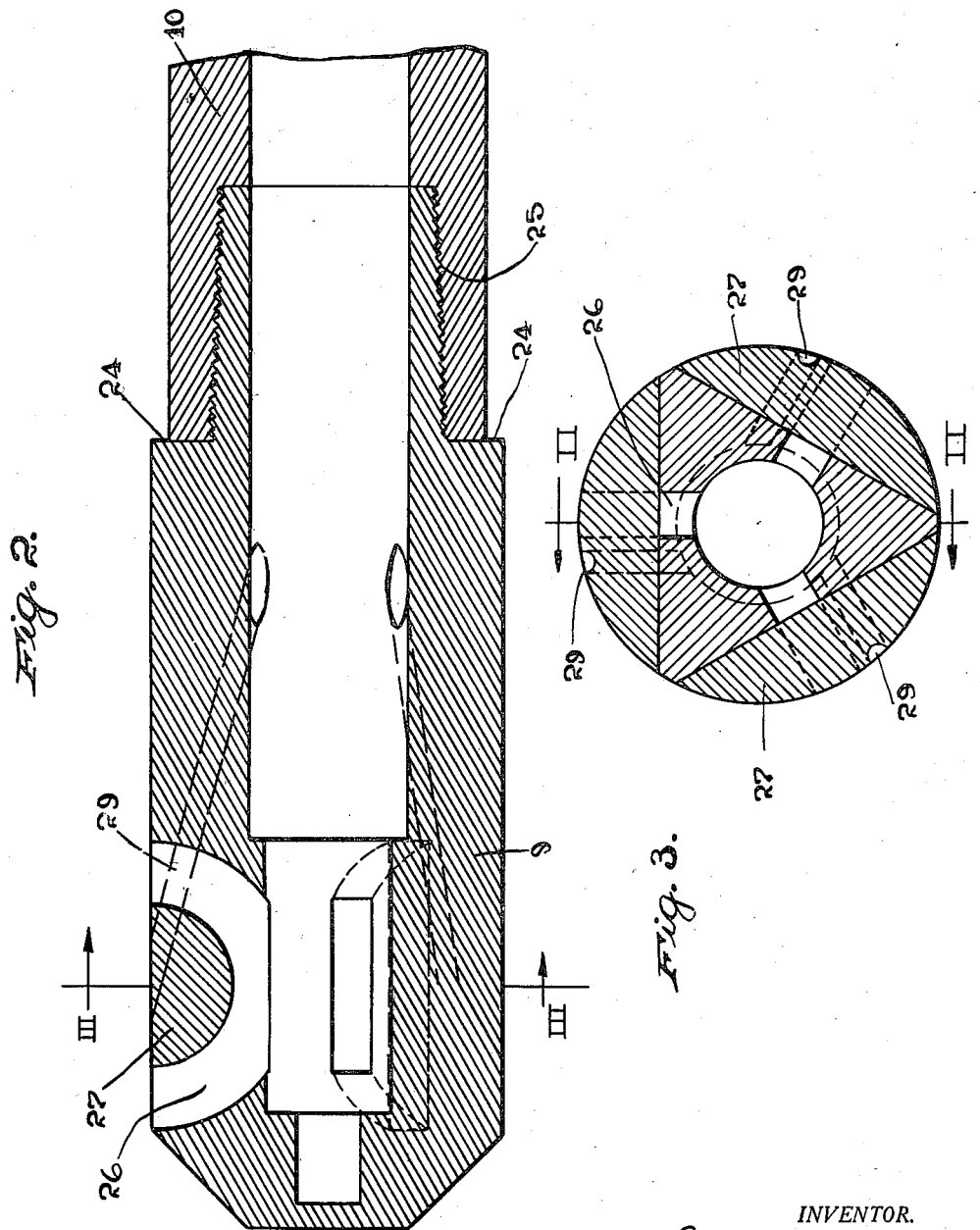
INVENTOR.
CLEMENT A. KETTL
BY Bradley & Bee
ATTORNEYS.

Patented July 7, 1936

2,046,386

UNITED STATES PATENT OFFICE 2,046,386

BORING TOOL

Clement A. Kettl, Ford City, Pa., assignor to Pittsburgh Plate Glass Company, Allegheny County, Pa., a corporation of Pennsylvania Application July 3, 1935, Serial No. 29,699

2 Claims. (Cl. 77—58)

The invention relates to boring tools, and has for its objects the provision of a construction designed for heavy duty having an improved form of cutting element and means for supporting the same securely through a wide range of adjustment. A further object is the provision of a tool of cheap, simple construction, which is efficient in operation and durable under severe conditions of service. One embodiment of the invention is illustrated in the accompanying drawings, wherein:

Figure 1 is an assembly view in longitudinal section, the dotted lines indicating the relation of the tool to the machine in which it is mounted.

Figs. 2 and 3 are enlarged detail sections, Fig. 2 being taken on the line II—II of Fig. 3, and Fig. 3 being taken on the line III—III of Fig. 2. And Figs. 4 and 5 are detail views of the cutting tool, Fig. 4 being a side elevation, and Fig. 5 a transverse section.

Referring to Fig. 1, 6 is the work, in this instance, a roll clamped at its left hand end in a lathe chuck; 7 is a steady rest for supporting the right hand end of the work during the boring operation; and 8 is the carriage in which the stem of the boring tool is clamped in any suitable manner, such carriage being fed to the left by the lathe mechanism during the cutting operation. The boring tool comprises a head 9, a stem 10, a feed bar 11, and semi-circular cutting tools 12, 12, 12.

The feed bar 11 is supported in a pair of bushings 13 and 14 and is provided with a thrust collar 15 which is engaged by the sleeve 16 so that the shaft is held against endwise movement with respect to the stem. The bar carries at its outer end a hand wheel 17 whose hub is keyed to the shaft and locked in position by means of the nut 18. The inner end of the feed shaft 11 is provided with a worm 19 which engages gear teeth 20 on the inner sides of the cutting tools, so that by rotating the shaft 11 any desired adjustment of the tools may be secured.

The stem 10 of the boring tool is positioned initially in the end of the work by means of the flanged bushing 21 held in place by the studs 22. This bushing is of such length that when the cutting tools are at the position shown at the end of the shoulder 23 which is to be cut in the work, the end of the bushing engages the shoulder 24 which is formed at the meeting ends of the stem and head, as indicated in Fig. 2, the bushing thus serving as a guide for the starting point of the cut. The stem and head are secured together by the threads 25 (Fig. 2).

The slots 26, in which the cutting tools are mounted, are formed by a milling operation and the upper walls of the slots are provided by the use of the inserts 27 which are welded in place. These inserts are formed by cutting in two, short sections of cold rolled shafting whose diameter corresponds to the curvature at 28 (Fig. 4) on the inner sides of the cutting tools. These sections of shafting are machined on their outer sides to approximately the curvature indicated in Fig. 3 preliminary to welding them in position. After they are welded in position, the head is placed in a lathe and the outer surface is turned down to a true cylindrical shape. Air holes 29 are preferably provided, as indicated in Figs. 2 and 3, leading to the interior of the head and air is supplied under pressure to the stem through the connection 39 (Fig. 1). The slots 26 as thus provided for the cutting tools serve to give such tools a secure support, so that in operation chattering and vibration is reduced to a minimum. The tools may be easily adjusted from time to time through the substantial range which is necessary in order to bore out the center of the work 6 to any desired extent. The tool as thus constructed is efficient in operation and durable under severe conditions of service, making it particularly adaptable for boring out the centers of rolls, such as the member 6 whose right hand end is shown in Fig. 1. Other advantages incident to construction will be readily apparent to those skilled in the art.

What I claim is:

1. In combination in a boring tool, a cylindrical head having in its wall a semi-circular slot whose axis of generation is transverse to the axis of the head and whose inner side opens to the interior of the head, a semi-circular tool fitting in the slot having a cutting edge at one end and provided with gear teeth on its outer periphery projecting to the inside of the head, and adjusting means for the tool comprising a shaft swiveled concentrically of the head and provided with a worm engaging said teeth, said slot being formed so as to engage and guide both the inner and outer curved faces of the tool and said shaft being extended out past the end of the head whereby the position of the tool may be adjusted after the head is inserted in the article to be bored.

2. In combination in a boring tool, a cylindrical head having in its wall a semi-circular slot whose axis of generation is transverse to the axis of the head and whose inner side opens to the interior of the head, a semi-circular tool fitting in the slot having a cutting edge at one end and provided with gear teeth on its outer periphery projecting to the inside of the head, and adjusting means for the tool comprising a shaft swivelled concentrically of the head and provided with a worm engaging said teeth, the outer wall of the slot comprising a semi-circular insert welded in position, and acting as a guide for the tool, said shaft being extended out past the end of the head whereby the position of the tool may be adjusted after the head is inserted in the article to be bored.

CLEMENT A. KETTL.